(12) United States Patent
Clark et al.

(10) Patent No.: US 11,039,677 B2
(45) Date of Patent: Jun. 22, 2021

(54) ADJUSTABLE BACKPACKS

(71) Applicant: HEWLETT-PACKARD DEVELOPMENT COMPANY, L.P., Houston, TX (US)

(72) Inventors: Alexander Wayne Clark, Houston, TX (US); Brandon James Lee Haist, Houston, TX (US); Ricky Thomas Burks, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 470 days.

(21) Appl. No.: 16/083,742

(22) PCT Filed: Apr. 10, 2017

(86) PCT No.: PCT/US2017/026797
§ 371 (c)(1),
(2) Date: Sep. 10, 2018

(87) PCT Pub. No.: WO2018/190791
PCT Pub. Date: Oct. 18, 2018

(65) Prior Publication Data
US 2021/0007469 A1 Jan. 14, 2021

(51) Int. Cl.
*A45F 3/04* (2006.01)
*G06F 3/01* (2006.01)

(52) U.S. Cl.
CPC .............. *A45F 3/047* (2013.01); *G06F 3/011* (2013.01); *A45F 2200/0525* (2013.01)

(58) Field of Classification Search
CPC ... A45F 3/047; A45F 2200/0525; G06F 3/011
See application file for complete search history.

(56) References Cited

U.S. PATENT DOCUMENTS

| 5,161,722 A | 11/1992 | Hembree | |
| 6,053,381 A * | 4/2000 | Fahl | A45F 3/047 |
| | | | 150/108 |
| 7,152,771 B2 * | 12/2006 | Le Gal | A45F 3/047 |
| | | | 224/631 |

(Continued)

FOREIGN PATENT DOCUMENTS

| CA | 1044197 | 12/1978 |
| CN | 203555310 U | 4/2014 |

(Continued)

OTHER PUBLICATIONS

Eadicicco, "What It's Like to Try a Virtual Reality 'Backpack'", Retrieved from Internet—http://time.com/4456547/hp-virtual-reality-backpack-2016/, Aug. 18, 2016, 13 Pages.

*Primary Examiner* — Justin M Larson
(74) *Attorney, Agent, or Firm* — Brooks Cameron & Huebsch PLLC

(57) ABSTRACT

Example implementations relate to adjustable backpacks. In some examples, a backpack may comprise a spindle coupled to a set of straps and a load, a distance sensor, an actuator coupled to the spindle, an angle sensor, and an angle adjuster coupled to the load. The actuator may actuate in response to a first signal from the distance sensor to adjust a length of the set of straps. The angle adjuster may activate in response to a second signal from the angle sensor.

15 Claims, 8 Drawing Sheets

(56) References Cited

U.S. PATENT DOCUMENTS

| | | | | |
|---|---|---|---|---|
| 7,600,660 B2* | 10/2009 | Kasper | ............... | A44B 11/065 224/162 |
| 7,931,178 B2* | 4/2011 | Rome | ............... | A45F 3/08 224/634 |
| 7,946,460 B2* | 5/2011 | Yip | ............... | A45F 3/047 224/631 |
| 7,997,466 B2* | 8/2011 | Fidrych | ............... | A45F 3/12 224/634 |
| 8,066,164 B2* | 11/2011 | Gregory | ............... | A45F 3/047 224/631 |
| 8,172,117 B2* | 5/2012 | Maggi | ............... | A45F 3/08 224/634 |
| 8,240,531 B2* | 8/2012 | Lam | ............... | A45F 3/04 224/631 |
| 8,505,791 B2* | 8/2013 | Fidrych | ............... | A45F 3/047 224/197 |
| 8,833,623 B2 | 9/2014 | Scicluna | | |
| 9,943,149 B2* | 4/2018 | Murphy | ............... | A45C 5/06 |
| 10,130,161 B2* | 11/2018 | Kao | ............... | A45F 3/047 |
| 10,198,029 B2* | 2/2019 | Smit | ............... | A45C 13/02 |
| 10,234,242 B2* | 3/2019 | Castrati | ............... | A41D 1/002 |
| 10,342,318 B2* | 7/2019 | Winfield | ............... | A45F 3/047 |
| 10,423,171 B2* | 9/2019 | Streeter | ............... | G05B 15/02 |
| 2006/0081672 A1 | 4/2006 | Cheldin | | |
| 2007/0056779 A1* | 3/2007 | Laniado | ............... | E04H 4/06 177/245 |
| 2008/0185411 A1* | 8/2008 | Rome | ............... | F03G 5/06 224/633 |
| 2008/0197163 A1* | 8/2008 | Yip | ............... | A45F 3/047 224/635 |
| 2009/0321481 A1* | 12/2009 | Licausi | ............... | A45F 3/08 224/262 |
| 2016/0161324 A1* | 6/2016 | Tse | ............... | G01G 19/58 73/862.541 |
| 2016/0166219 A1 | 6/2016 | Majewski et al. | | |
| 2019/0057582 A1* | 2/2019 | Smathers | ............... | A63F 13/85 |
| 2020/0057476 A1* | 2/2020 | Robinson | ............... | G06F 3/014 |
| 2020/0138377 A1* | 5/2020 | Huijbregts | ............... | A61B 5/4266 |
| 2020/0352747 A1* | 11/2020 | Streeter | ............... | A61F 2/7843 |
| 2021/0007469 A1* | 1/2021 | Clark | ............... | G06F 3/011 |

FOREIGN PATENT DOCUMENTS

| | | |
|---|---|---|
| CN | 104407701 A | 3/2015 |
| CN | 204812478 | 12/2015 |
| CN | 204829156 | 12/2015 |
| CN | 105901895 | 8/2016 |
| CN | 105901895 A | 8/2016 |
| GB | 2440604 A | 2/2008 |
| WO | 2001084978 A1 | 11/2001 |
| WO | WO-2014036374 | 3/2014 |
| WO | 2016065655 A1 | 5/2016 |

* cited by examiner

ADJUSTABLE BACKPACKS

BACKGROUND

Backpacks may be used in virtual reality (VR) and/or augmented reality (AR) systems. Backpacks may be a component of a VR/AR system and may include a computing device worn by a wearer and the computing device may be coupled to displays to provide a "virtual" and/or "augmented" reality to the wearer by providing images, screens, and/or other visual stimuli to the wearer via the displays.

DETAILED DESCRIPTION

Figure 1:
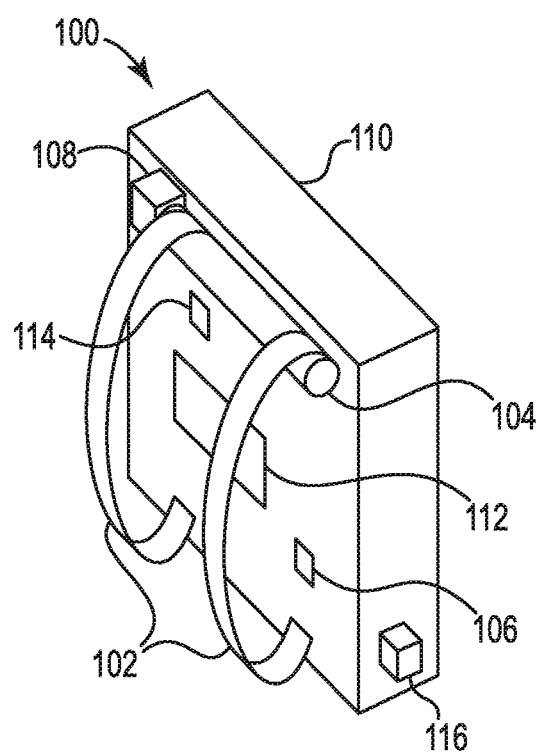
FIG. 1 illustrates an example of an adjustable backpack consistent with the disclosure.

Backpacks may be used in virtual reality (VR) and/or augmented reality (AR) systems. In some examples, a VR/AR system may include a backpack including a computing device worn by a wearer. The computing device may be coupled to a VR/AR headset that covers a wearer's eyes and provide visual stimuli to the wearer via a display, thereby substituting a "virtual" reality for actual reality. The VR system may allow the wearer to interact with the "virtual" reality world through games, educational activities, group activities, and the like.

An AR system may provide an overlay transparent or semi-transparent screen in front of a wearer's eyes such that reality is "augmented" with additional information such as graphical representations and/or supplemental data. For example, an AR system may overlay transparent or semi-transparent weather information, directions, and/or other information on an AR display for a wearer to examine.

VR/AR systems may be used in many different fields and/or for many different applications. For example, VR/AR systems may be used in gaming, aviation, engineering, medicine, geopositioning, training, military, government (e.g., fire, police, etc.), and sports, among other fields.

A backpack may include a load, such as a computing device. Properly positioning a load on a wearer's back may be desirable for ergonomic and/or functional reasons such as improving a particular wearer's AR/VR experience. For instance, properly positioning a load on a wearer's back may mitigate and/or avoid discomfort such as pinch points that may otherwise be experienced by the wearer. Moreover, where a load includes a heat producing component such as a computing device proper positioning and/or spacing may reduce the amount of heat from the computing device that reaches a wearer's neck and/or back as compared to an improperly positioned load such as those that may be associated with approaches that rely on manual adjustment of straps. It may be difficult and/or tedious to manually adjust the straps such that the load is ergonomically positioned on the wearer's back while maintaining proper positioning and spacing of the load. The difficult and/or tedious nature of manually adjusting the straps on the backpack may be exacerbated in situations in which multiple persons might wear a particular backpack, such as in an amusement park setting, video game arcade setting, and/or a training scenario in which a particular backpack can be shared between multiple wearers. Proper positioning and/or spacing of the load can be dependent on characteristics of a wearer's body such as a wearer's height, a wearer's posture, and/or the curvature of a wearer's back.

In some examples, a backpack may include a distance sensor an actuator, an angle sensor, and/or an angle adjuster to achieve a particular distance between the load and the wearer's back and/or a particular angle of the load relative to the ground to a level of precision that may be cumbersome, difficult and/or time consuming to achieve manually. The level of precision may be fine such that the particular distance may be achieved to a hundredth of an inch (e.g., 1.01 inches). The level of precision may be fine such that the particular angle may be achieved to a hundredth of a degree (e.g., 90.01 degrees where 90 degrees is vertical with respect to the ground). The distance sensor and/or the angle sensor may be in communication with the actuator and/or the angle adjuster such that precise adjustments can be made without a manual trial and error approach by a wearer.

Accordingly, the disclosure is directed to adjustable backpacks. Adjustable backpacks may include a spindle coupled to a set of straps and a load, a distance sensor, an actuator coupled to the spindle to actuate in response to a first signal from the distance sensor to adjust a length of the set of straps, an angle sensor, and an angle adjuster coupled to the load to activate in response to a second signal from the angle sensor. Desirably, in some examples herein may allow for the set of straps of a backpack to be automatically adjusted without intervention from the wearer or another person assisting the wearer in contrast to examples that rely on manual adjustment. Such automatic adjustment may promote a reduction in time, difficulty in achieving proper positioning, spacing of a load, facilitate a wearer's experience that is not beleaguered with discomfort and/or other issues that may arise under approaches relying on manual adjustment of the set of straps.

Some examples herein may include an angle sensor and an angle adjuster. The angle sensor may determine the angle of the load with respect to the ground. The angle adjuster may adjust the angle of the load with respect to the ground such that proper positioning of the load on the wearer's back and/or proper spacing from the wearer's back.

In some examples, a backpack may comprise a spindle coupled to a set of straps and a load, a distance sensor, an actuator coupled to the spindle, an angle sensor, and an angle adjuster coupled to the load. The actuator may actuate in response to a first signal from the distance sensor to adjust a length of the set of straps. The angle adjuster may activate in response to a second signal from the angle sensor. In some examples, the backpack may include a torque sensor coupled to the spindle and the actuator may cease to actuate in response to the torque sensor sensing a torque exceeding a threshold torque. As used herein, a "torque sensor" is a device that measures a rate of change of angular momentum of an object. In some examples, the backpack may include a pressure sensor coupled to the load and the actuator may cease to actuate in response to the pressure sensor sensing a pressure exceeding a threshold pressure. As used herein, a "pressure sensor" is a device that measures a force per unit area.

FIG. 1 illustrates an example of adjustable backpacks consistent with the disclosure. As shown in FIG. 1, a backpack 100 may include a set of straps 102, a spindle 104 coupled to the set of straps 102, an actuator 108 (e.g., a motor) coupled to the spindle 104, a distance sensor 106, an angle sensor 114, an angle adjuster 112, and a load 110. In some examples, the distance sensor 106 may be coupled to the load 110. As used herein, "distance sensor" refers to an electronic device that can measure a distance to a surface from the distance sensor, Examples of distance sensors include time-of-flight sensors, laser rangefinders, and/or LIDAR, among others types of distance sensors. For instance, in some examples, the distance sensor 106 may be a time-of-flight sensor.

The actuator 108 may actuate in response to a signal from the distance sensor 106. The actuator 108 may be actuatable to adjust the length of the set of straps 102. For example, if the distance sensor 106 determines that the distance between the load 110 and a wearer's back is too large then the actuator 108 may actuate such that a portion of the set of straps 102 is spooled to the spindle 104 thereby tightening (cinching) the set of straps 102. Similarly, if the distance sensor 106 determines that the distance between the load 110 and a wearer's back is too small then the actuator 108 may actuate such that a portion of the set of straps 102 is unspooled from the spindle 104 thereby loosening (uncinching) the set of straps 102. The actuator 108 may stop actuating in response to another signal from the distance sensor 106 that the distance between the load 110 and the wearer's back is proper. As discussed further below in association with FIG. 5, distance sensors may be coupled to a load at different locations such that the distance sensors determine different distances.

The angle sensor 114 may be coupled to the load 110 or be a component of the load 110. The angle sensor 114 may be, but is not limited to, an accelerometer. The angle adjuster 112 may actuate in response to a signal from the angle sensor 114. For example, if the angle sensor 114 determines that the load 110 is not vertical or nearly vertical then the angle adjuster 112 may activate to adjust the angle of the load 110 with respect to the ground (not illustrated in FIG. 1). The angle adjuster 112 may stop activating in response to another signal from the angle sensor 114 that the angle of the load 110 is proper (e.g., the load 110 is vertical or nearly vertical with respect to the ground). In some examples, the angle adjuster 112 may be activated in response to the distance sensor 106 determining that the distance between the load 110 and a wearer of the backpack is less than a threshold distance. Although not illustrated in FIG. 1, the backpack 100 may include interconnects for data and/or control signals between the distance sensor 106 and the actuator 108 and/or the angle adjuster 112 and between the angle sensor 114 and the actuator 108 and/or the angle adjuster 112.

In some examples, the backpack 100 may include a power supply 116, which may supply power to the distance sensor 106, the actuator 108, the angle sensor 114, and/or the angle adjuster 112. For instance, the power supply 116 may supply alternating current (AC) and/or direct current (DC) to power the distance sensor 106, the actuator 108, the angle sensor 114, and/or the angle adjuster 112. In some examples, the power supply 116 may be included in the backpack 100 to provide a mobile source of power to supply power to each of the distance sensor 106, the actuator 108, the angle sensor 114, and the angle adjuster 112. The power supply 116 may be coupled to the load 110 as shown in FIG. 1, but examples are not so limited. The power supply 116 may be coupled to any face of the load 110 or any component of the backpack 100.

In some examples where the load 110 is a computing device 110, the distance sensor 106, the actuator 108, the angle sensor 114, the angle adjuster 112, and the computing device 110 may be powered by a power supply 116. For instance, the power supply 116 may supply alternating current (AC) and/or direct current (DC) to power the distance sensor 106, the actuator 108, the angle sensor 114, the angle adjuster 112, and/or the computing device 110. In some examples, the power supply may be included in a backpack to provide a mobile source of power to supply power to each of the distance sensor 106, the actuator 108, the angle sensor 114, the angle adjuster 112, and the computing device 110. In some examples, the power supply 116 can be a component of the computing device 110.

Although some examples described herein are directed to a backpack that is a component of a VR/AR system such that the load 110 is a computing device, examples are not so limited. In some examples, the load 110 may be a storage compartment. In some examples, the load 110 may be detachable from and attachable to the backpack 100. For example, the load 110 may be an object, such as a sleeping bag, that is detachable from and attachable to the backpack 100.

In contrast to other approaches that may use an elastic component to adjust the fit of a set of straps of a backpack, in some examples the set of straps 102 may be inelastic straps. As used herein, "inelastic straps" refers to straps that have a fixed total length as compared to elastic straps that are stretchable. The actuator 108 and the spindle 104 may adjust the length of the set of straps 102 but the total length of the set of straps 102 is fixed. The set of straps 102 may be made from any suitable material or fabric to form the set of straps 102.

Although not illustrated in FIG. 1, some examples may include a first actuator coupled to a first spindle and a second actuator coupled to a second spindle. A first distal end of the set of straps 102 may be coupled to the first spindle and a second distal end of the set of straps 102 may be coupled to the second spindle. The first actuator and the second actuator may actuate, or stop actuating, in response to a signal from the distance sensor 104.

Although not illustrated in FIG. 1, some examples may include a torque sensor coupled to the spindle 104, The actuator 108 may cease to actuate in response to the torque sensor sensing a torque exceeding a threshold torque. An example of a torque sensor is a magnetoelastic torque sensor. Although not illustrated in FIG. 1, some examples may include a pressure sensor coupled to the load 110, The actuator 108 may cease to actuate in response to the pressure sensor sensing a pressure exceeding a threshold pressure. Examples of pressure sensors include absolute pressure sensors, gauge pressure sensors, differential pressure sensors, and/or sealed pressure sensors, among others types of distance sensors.

Figure 7:
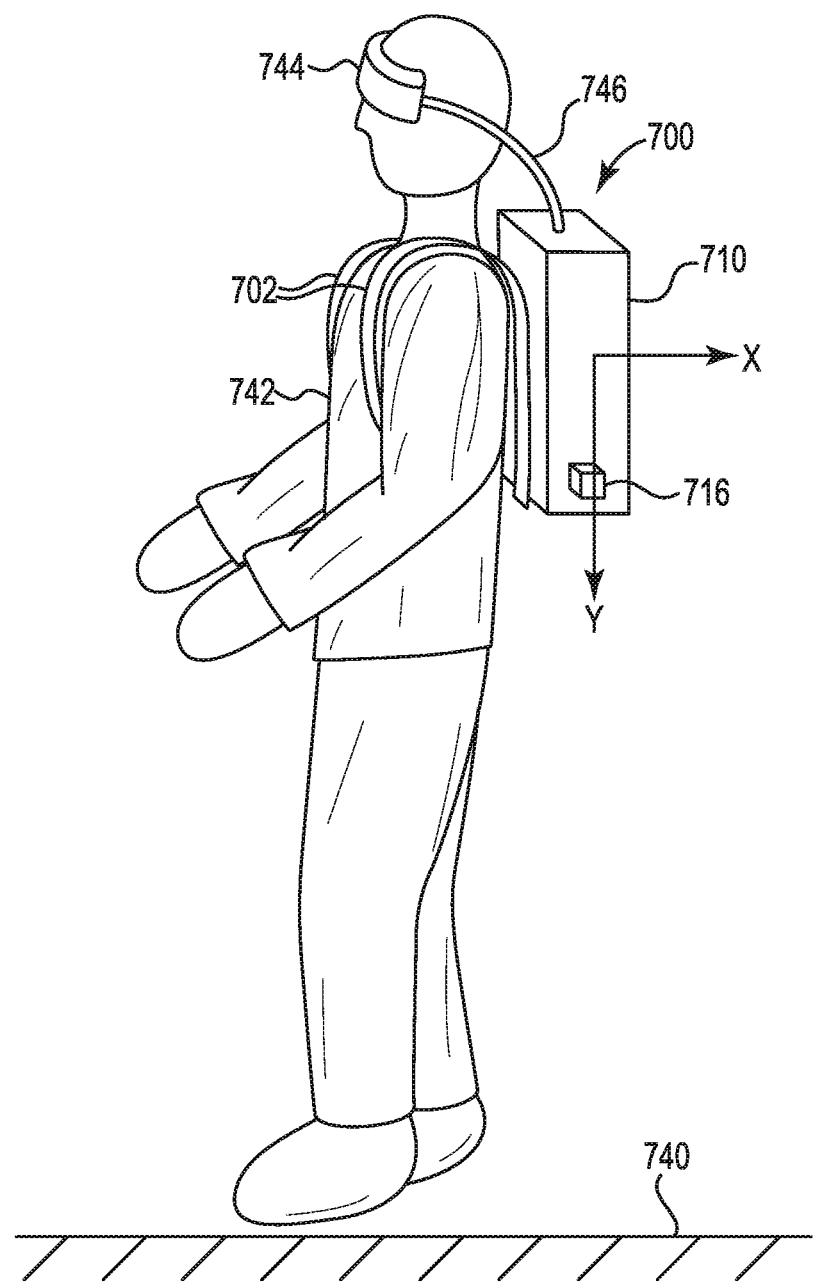
FIG. 7 illustrates an example of an adjustable backpack consistent with the disclosure.

In some examples where the load 110 is a computing device 110, the computing device 110 may include a processing resource and memory storing instructions. The instructions may be executable by the processing resource. In some examples, the instructions may include instructions to actuate the actuator in response to a signal from the distance sensor and/or the angle sensor. In some examples, the instructions may include instructions to activate the angle adjuster in response to a signal from the angle sensor and/or the distance sensor. Although not illustrated in FIG. 1, the backpack 100 may include interconnects for data, control signals, and/or power between the distance sensor 106, the actuator 108, the angle sensor 114 and/or the angle adjuster 112 and the computing device 110. In some examples, the instructions may include instructions to cause the actuator 108 cease to actuate in response to a torque sensor sensing a torque exceeding a threshold torque and/or in response to a pressure sensor sensing a pressure exceeding a threshold pressure. In some examples where the backpack 100 is a component of a VR/AR system, the instructions may include instructions pertaining to a VR/AR experience. FIG. 7 shows an example of a backpack 700 that is a component of a VR/AR system.

Figure 2:
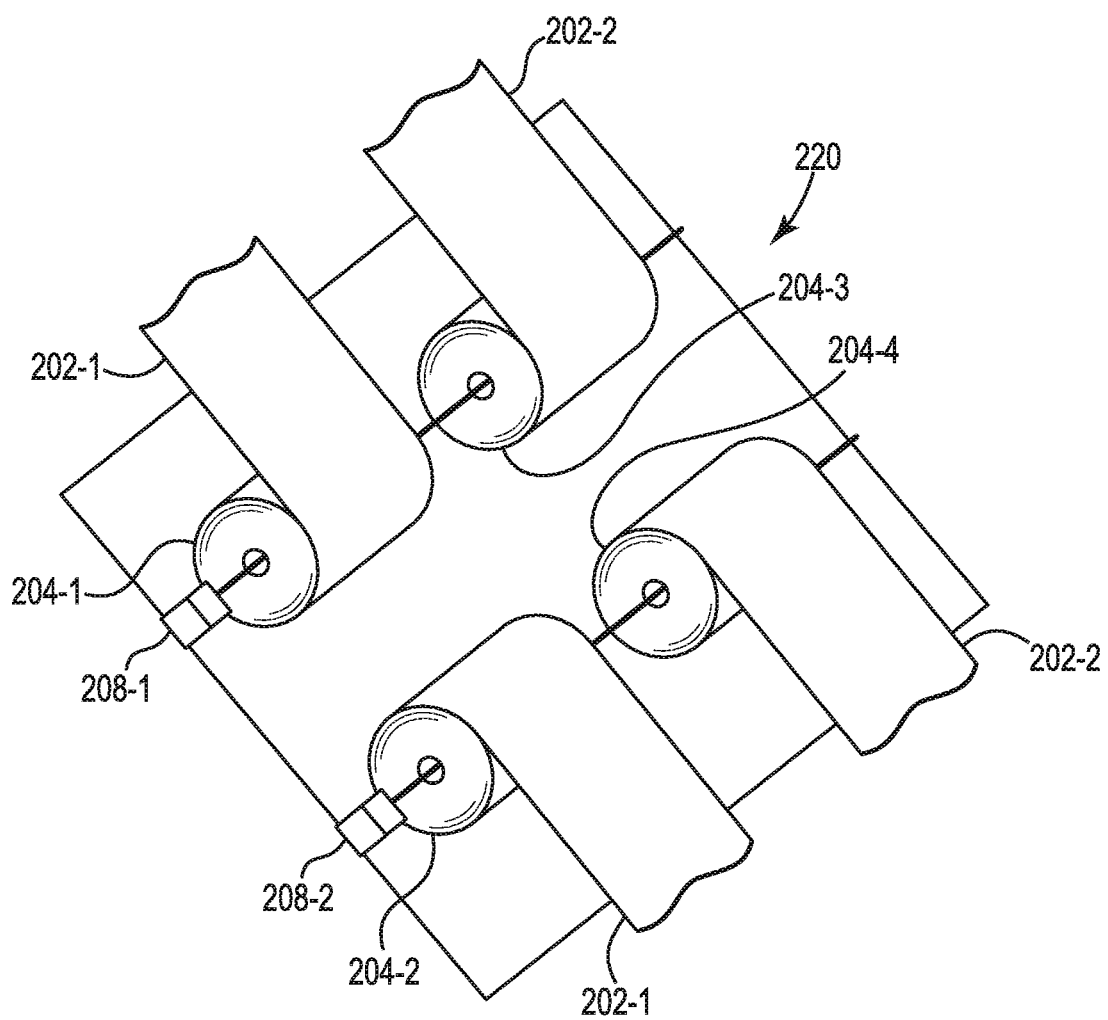
FIG. 2 illustrates an example of a placement adjuster consistent with the disclosure.

FIG. 2 illustrates an example of a placement adjuster consistent with the disclosure. As shown in FIG. 2, a placement adjuster 220 may include a first strap 202-1 (a portion of the first strap illustrated for ease of illustration), a second strap 202-2 (a portion of the second strap illustrated for ease of illustration), a first spindle 204-1, a second spindle 204-2, a third spindle 204-3, a fourth spindle 204-4, a first actuator 208-1, and a second actuator 208-2. A first distal end of the first strap 202-1 may be coupled to the first spindle 204-1 and a second distal end of the first strap 202-1 may be coupled to the second spindle 204-2. Similarly, a first distal end of the second strap 202-2 may be coupled to the third spindle 204-3 and a second distal end of the second strap 202-2 may be coupled to the fourth spindle 204-4. The first actuator 208-1 may be coupled to the first spindle 204-1 and the third spindle 204-3, and the second actuator 208-2 may be coupled to the second spindle 204-2 and the fourth spindle 204-4. The placement adjuster 220 may be coupled to a load, such as the load 110 illustrated in FIG. 1.

The first and second straps 202-1 and 202-2 may be analogous to the set of straps 102 illustrated in FIG. 1. The first spindle 204-1, the second spindle 204-2, the third spindle 204-3, and the fourth spindle 204-4 may be analogous to the spindle 104 illustrated in FIG. 1. The first and second actuators 208-1 and 208-2 may be analogous to the actuator 108 illustrated in FIG. 1. The first and second actuators 208-1 and 208-2 may actuate in response to a signal from a distance sensor, which may be analogous to the distance sensor 106 illustrated in FIG. 1.

The first and second actuators 208-1 and 208-2 may be actuated in conjunction to translate a load, such as the load 110 illustrated in FIG. 1, vertically. For example, a portion of the first strap 202-1 may be unspooled from the first spindle 204-1 and a portion of the second strap 202-2 may be unspooled from the third spindle 204-3, and a portion of the first strap 202-1 may be spooled to the second spindle 204-2 and a portion of the second strap 202-2 may be spooled to the fourth spindle 204-4. If the spooling and unspooling occurs simultaneously or nearly simultaneously, then the load may be translated vertically without affecting the tension on the first and second straps 202-1 and 202-2.

In some examples, the placement adjuster 220 may activate in response to a signal from the distance sensor to adjust a position the backpack on a wearer. The placement adjuster 220 may periodically activate in response to a set of periodic signals from the distance sensor and/or the angle sensor. For example, instead of an initial calibration of the backpack when a wearer first puts on the back, the backpack can periodically check the position, spacing, and/or angle of the load. If the distance sensor and/or the angle sensor detect a change in the position, spacing, and/or angle of the load, the placement adjuster 220 may be activate (e.g., the first actuation 208-1 and/or the second actuator 208-2 may actuate) to once again achieve proper positioning, spacing, and/or angle of the backpack while the wearer is wearing the backpack (real-time adjustments). For example, the position adjustment may occur while the wearer is wearing the backpack during a VR/AR experience.

Figure 3:
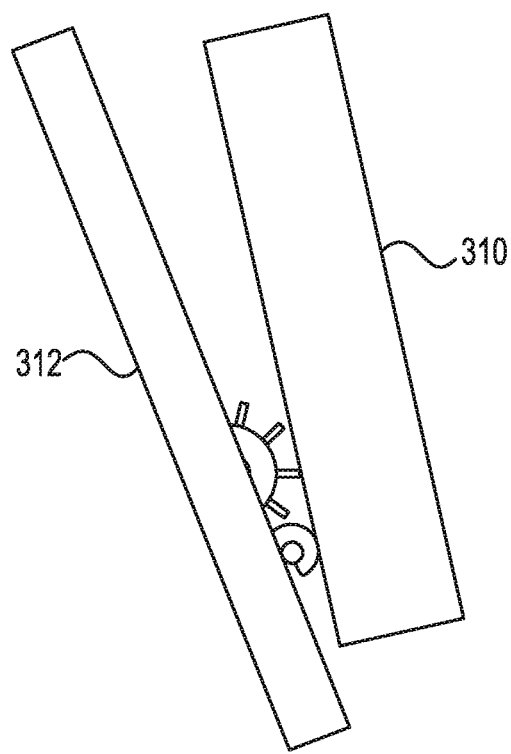
FIG. 3 illustrates an example of an angle adjuster consistent with the disclosure.

FIG. 3 illustrates an example of an angle adjuster consistent with the disclosure. The angle adjuster 312 may be analogous to the angle adjuster 112 illustrated in FIG. 1. As shown in FIG. 3, the angle adjuster 312 may be coupled to a load 310. The load 310 may be analogous to the load 110 illustrated in FIG. 1. In some examples, the angle adjuster 312 may include a gear, hydraulics, or other mechanism that interfaces with the load 310 such that an angle of the load 310 is adjusted. The angle adjuster 312 may activate in response to a signal from an angle sensor, which may be analogous to the angle sensor 114 illustrated in FIG. 1.

In some examples, the angle adjuster 312 may activate in response to a signal from the angle sensor to adjust an angle of the backpack relative to the ground. The angle adjuster 312 may periodically activate in response to a set of periodic signals from the angle sensor and/or the distance sensor. For example, instead of an initial calibration of the backpack when a wearer first puts on the back, the backpack can periodically check the position, spacing, and/or angle of the load. If the distance sensor and/or the angle sensor detect a change in the position, spacing, and/or angle of the load, the angle adjuster 312 may activate to once again achieve proper positioning, spacing, and/or angle of the backpack while the wearer is wearing the backpack (real-time adjustments). For example, the angle adjustment may occur while the wearer is wearing the backpack during a VR/AR experience.

Figure 4:
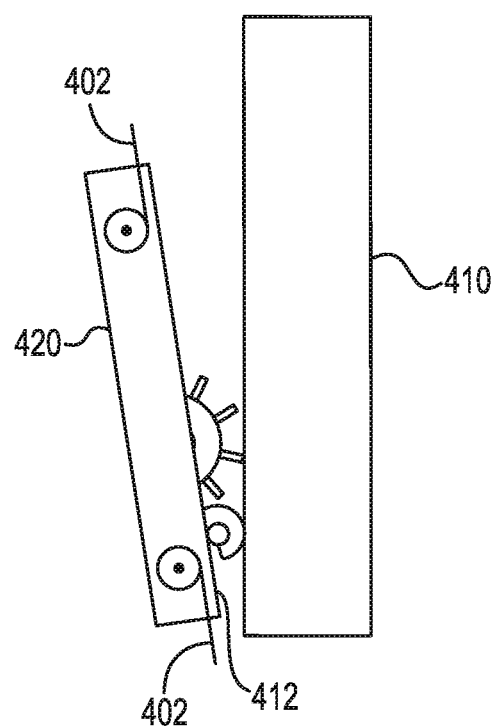
FIG. 4 illustrates a side view of a portion of an example of an adjustable backpack consistent with the disclosure.

FIG. 4 illustrates a side view of a portion of an example of adjustable backpacks consistent with the disclosure. As shown in FIG. 4, the placement adjuster 420, which includes the strap 402 (a portion of the strap illustrated for ease of illustration), may be coupled to the angle adjuster 412. The angle adjuster 412 may be coupled to the load 410. The placement adjuster 420 may be analogous to the placement adjuster 220 illustrated in FIG. 2, the angle adjuster 412 may be analogous to the angle adjuster 312 illustrated in FIG. 3, and the load 410 may be analogous to the load 110 illustrated in FIG. 1.

Figure 5:
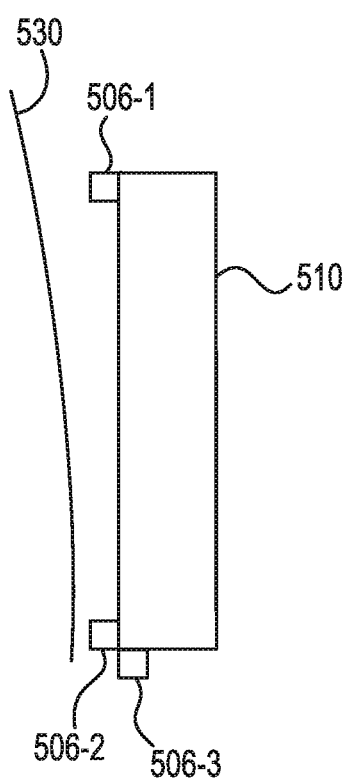
FIG. 5 illustrates a side view of a portion of an example of an adjustable backpack consistent with the disclosure.

FIG. 5 illustrates a side view of a portion of an example of adjustable backpacks consistent with the disclosure. As shown in FIG. 5, distance sensors, such as the distance sensors 506-1, 506-2, and 506-3, may be coupled to the load 510 at different locations. For example, the distance sensors 506-1 and 506-2 may be positioned on a side of the load 510 that is adjacent to a wearer's back 530. In some examples, the distance sensors 506-1 and 506-2 may be located at or near the center of the side of the load 510 or at the corners of the side of the load 510. The distance sensors 506-1 and 506-2 may determine distances between the load 510 and the wearer's back 530.

The distance sensor 506-3 may be positioned on the bottom of the load 510 such that it faces the ground (not illustrated in FIG. 5). The distance sensor 506-3 may determine the distance between the load 510 and the ground. The distances determined by the distance sensors 506 may be used to properly position and space the load 510 to accommodate the profile and contour of a wearer's back 530.

The distance sensors 506 may be analogous to the distance sensor 106 and the load 510 may be analogous to the load 110 illustrated in FIG. 1. Although FIG. 5 illustrates three distance sensors, examples may include a greater or lesser quantity of the distance sensors positioned on the side and/or the bottom of the load 510. However, it may be beneficial to include a distance sensor on a side of the load adjacent to a wearers back 530 for proper positioning and spacing of the load 510.

Figure 6:
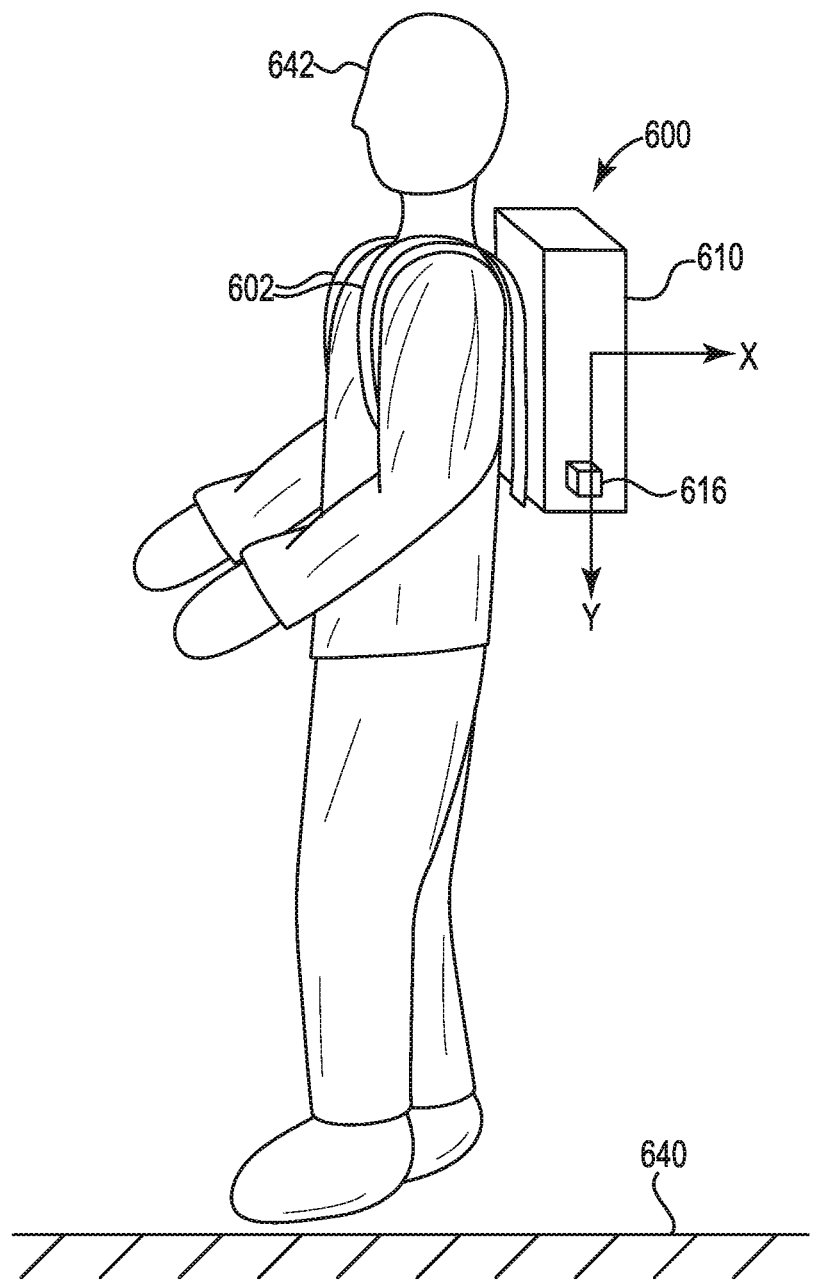
FIG. 6 illustrates an example of an adjustable backpack consistent with the disclosure.

FIG. 6 illustrates an example of adjustable backpacks consistent with the disclosure. As shown in FIG. 6, the backpack 600 may be worn on the shoulders of a wearer 642. The distance sensor, spindle, actuator, angle sensor, angle adjuster, and/or placement adjuster (all not illustrated in FIG. 6) may be used to ensure proper positioning of the load 610 on the wearer 642, a proper height of the load 610 (in the z-direction) with respect to the ground 640, and/or proper spacing of the load 610 from the wearer 642 (in the x-direction). The angle sensor and angle adjuster may be used to ensure that the load 610 is vertical or nearly vertical with respect to the ground 640 (perpendicular or nearly perpendicular to the ground 640). In some examples, the backpack 600 may include a power supply 616, which may be a mobile power supply to power the distance sensor, spindle, actuator, angle sensor, angle adjuster, and/or placement adjuster. The power supply 616 may be coupled to the load 610 as shown in FIG. 6, but examples are not so limited. The power supply 616 may be coupled to any face of the load 610 or any component of the backpack 600. In some examples, the placement adjuster; distance sensor, set of straps, spindle, actuator, angle sensor, and angle adjuster may be analogous to the placement adjuster, distance sensor, set of straps, spindle, actuator, angle sensor, and angle adjuster described in association with FIGS. 1-5, herein.

FIG. 7 illustrates an example of adjustable backpacks consistent with the disclosure. In the example of FIG. 7, the load 710 is a computing device 710 that is a component of a VR/AR system. The computing device 710 may be received within the backpack 700. As shown in FIG. 7, a VR/AR headset 744 may be worn by the wearer. In some examples, the VR/AR headset 744 may cover the wearer's 742 eyes and provide visual stimuli to the wearer 742 via a display, thereby substituting a "virtual" reality for actual reality. The VR system may allow the wearer to interact with the "virtual" reality world through games, educational activities, group activities, and the like. In some examples, the VR/AR headset 744 may include an overlay transparent or semi-transparent screen in front of a wearer's 742 eyes for an AR system such that reality is "augmented" with additional information such as graphical representations and/or supplemental data. For example, an AR system may overlay transparent or semi-transparent weather information, directions, and/or other information on an AR display for the wearer 742 to examine. The VR/AR headset 744 may be coupled to the computing device 710 via an interconnect 746. Data may be transferred to the VR/AR headset 744 from the computing device 710 and/or from the VR/AR headset 744 to the computing device 710 via the interconnect 746. The interconnect 746 may transfer power from a power source, such as the power supply 716, to the VR/AR headset 744.

As shown in FIG. 7, the backpack 700 may be worn on the shoulders of a wearer 742. The distance sensor, spindle, actuator, angle sensor, angle adjuster, and/or placement adjuster (all not illustrated in FIG. 7) may be used to ensure proper positioning of the computing device 710 on the wearer 742, a proper height of the computing device 710 (in the z-direction) with respect to the ground 740, and/or proper spacing of the computing device 710 from the wearer 742 (in the x-direction). The angle sensor and angle adjuster may be used to ensure that the computing device 710 is vertical or nearly vertical with respect to the ground 740 (perpendicular or nearly perpendicular to the ground 740). In some examples, the angle adjuster may be activated in response to the distance sensor determining that the distance between the computing device 710 and the wearer 742 is less than a threshold distance. In some examples, the backpack 700 may include a power supply 716, which may be a mobile power supply to power the distance sensor, spindle, actuator, angle sensor, angle adjuster, and/or placement adjuster. The power supply 716 may be coupled to the computing device 710 as shown in FIG. 7, but examples are not so limited. The power supply 716 may be coupled to any face of the computing device 710 or any component of the backpack 700. In some examples, the placement adjuster, distance sensor, set of straps, spindle, actuator, angle sensor, and angle adjuster may be analogous to the placement adjuster, distance sensor, set of straps, spindle, actuator, angle sensor, and angle adjuster described in association with FIGS. 1-5, herein.

Figure 8:
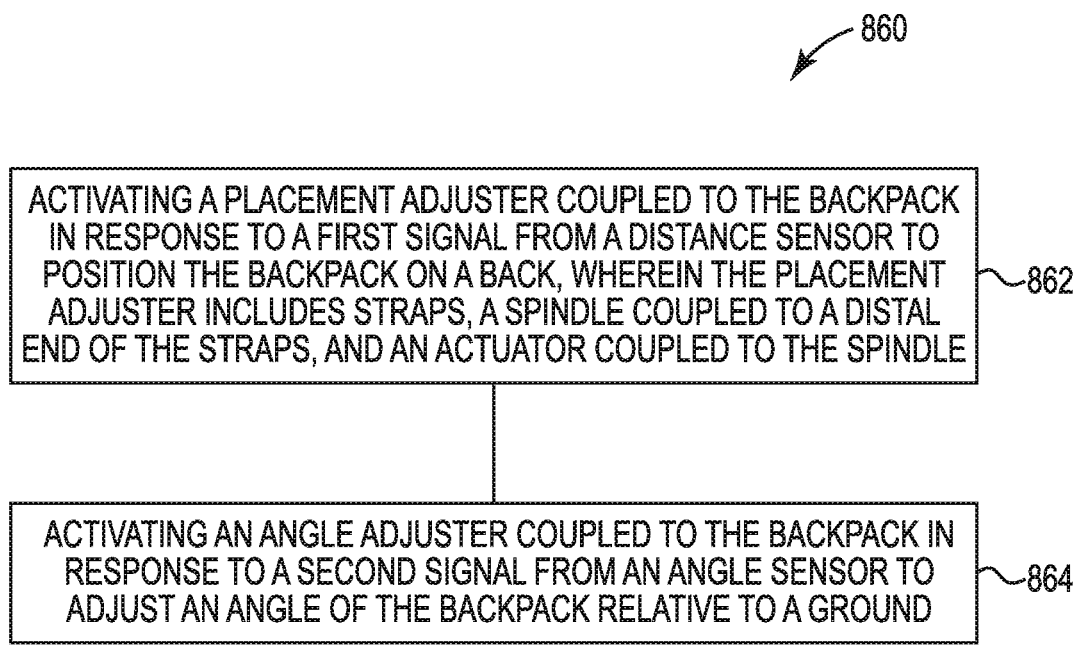
FIG. 8 illustrates an example flow diagram illustrating an example of a method of adjusting a backpack consistent with the disclosure.

FIG. 8 illustrates an example flow diagram illustrating an example of a method of adjusting a backpack consistent with the disclosure. At 862, the method 860 may include activating a placement adjuster coupled to the backpack in response to a first signal from a distance sensor to position the backpack on a back, wherein the placement adjuster includes a set of straps, a spindle coupled to a distal end of the set of straps, and an actuator coupled to the spindle. In some examples, the placement adjuster, distance sensor, set of straps, spindle, and actuator may be analogous to the placement adjuster, distance sensor, set of straps, spindle, and actuator described in association with FIGS. 1, 2, and 4-7, herein.

At 864, the method 860 may include activating an angle adjuster coupled to the backpack in response to a second signal from an angle sensor to adjust an angle of the backpack relative to a ground. In some examples, the angle adjuster and angle sensor may be analogous to the angle adjuster and angle sensor described in association with FIGS. 1 and 3-7, herein.

In some examples, the method 860 may further include periodically activating the placement adjuster in response to a first set of periodic signals from the distance sensor and/or periodically activating the angle adjuster in response to a second set of periodic signals from the angle sensor. For example, instead of an initial calibration of the backpack when a wearer first puts on the back, the backpack can periodically check the position, spacing, and/or angle of the load. If the distance sensor and/or the angle sensor detect a change in the position, spacing, and/or angle of the load, the actuator (for example, the actuator of the placement adjuster) may be actuated and/or the angle adjuster may be activated to once again achieve proper positioning, spacing, and/or angle of the load while the wearer is wearing the load (real-time adjustments). For example, the adjustment may occur while the wearer is wearing the backpack during a VR/AR experience.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure.

The figures herein follow a numbering convention in which the first digit corresponds to the drawing figure number and the remaining digits identify an element or component in the drawing. For example, reference numeral 102 may refer to element "02" in FIG. 1 and an analogous element may be identified by reference numeral 202 in FIG. 2. Multiple analogous elements within one figure may be referenced with a reference numeral followed by a hyphen and another numeral or a letter. For example, 202-1 may reference element 02-1 in FIGS. 2 and 202-2 may reference element 02-2, which can be analogous to element 02-1. Such analogous elements may be generally referenced without the hyphen and extra numeral or letter. For example, elements 202-1 and 202-2 may be generally referenced as 202. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

What is claimed:

1. A backpack, comprising:
    a spindle coupled to a set of straps and a load;
    a distance sensor;
    an actuator coupled to the spindle, wherein the actuator is to adjust a length of the set of straps in response to a first signal from the distance sensor;
    an angle sensor;
    an angle adjuster coupled to the load to activate in response to a second signal from the angle sensor; and
    a power supply.

2. The backpack of claim 1, wherein the set of straps are inelastic.

3. The backpack of claim 1, wherein the set of straps is coupled to the spindle at a first distal end of the set of straps, and wherein the set of straps are coupled to a second spindle at a second distal end of the set of straps, and
    wherein the backpack further comprises a second actuator coupled to the second spindle.

4. The backpack of claim 1, wherein the distance sensor s positioned on a side of the load that is adjacent to a back.

5. The backpack of claim 1, wherein the distance sensor is positioned on a bottom of the load.

6. The backpack of claim 1, wherein the load is detachable from and attachable to the backpack.

7. A backpack, comprising:
    a first spindle coupled to a first distal end of a first strap;
    a second spindle coupled to a second distal end of the first strap;
    a third spindle coupled to a first distal end of a second strap;
    a fourth spindle coupled to a second distal end of the second strap;
    a first actuator coupled to the first and second spindles to actuate in response to a signal from a distance sensor of a computing device, wherein the computing device is received within the backpack; and
    a second actuator coupled to the third and fourth spindles to actuate in response to the signal from the distance sensor.

8. The backpack of claim 7, wherein the backpack includes a torque sensor coupled to the first spindle, the second spindle, the third spindle, or the fourth spindle, wherein the torque sensor is to cause the first and second actuators cease to actuate in response to the torque sensor sensing a torque exceeding a threshold torque.

9. The backpack of claim 7, wherein the backpack includes a pressure sensor, wherein the pressure sensor is to cause the first and second actuators cease to actuate in response to the pressure sensor sensing a pressure exceeding a threshold pressure.

10. The backpack of claim 7, wherein the computing device includes an angle sensor, and
    wherein the backpack includes an angle adjuster to activate in response to a signal from the angle sensor.

11. The backpack of claim 10, wherein the angle adjuster is to activate in response to the distance sensor determining a distance between the computing device and a wearer of the backpack is less than a threshold distance.

12. The backpack of claim 7, wherein the first and second actuators are actuatable in conjunction to translate the computing device vertically.

13. The backpack of claim 7, further comprising a power supply, wherein the power supply supplies power to the distance sensor, the first actuator, the second actuator, and the computing device.

14. A backpack, comprising:
    a placement adjuster coupled to the backpack, wherein the placement adjuster is to activate in response to a first signal from a distance sensor to adjust a position the backpack on a wearer,
    wherein the placement adjuster includes a set of straps, a spindle coupled to a distal end of the set of straps, and an actuator coupled to the spindle; and
    an angle adjuster coupled to the backpack, wherein the angle adjuster is to activate in response to a second signal from an angle sensor to adjust an angle of the backpack relative to a ground.

15. The backpack of claim 14, wherein the placement adjuster is to periodically activate in response to a first set of periodic signals from the distance sensor, and
    wherein the angle adjuster is to periodically activate in response to a second set of periodic signals from the angle sensor.

* * * * *